United States Patent Office 3,466,349
Patented Sept. 9, 1969

3,466,349
**PROCESS FOR POLYMERIZING MONOVINYL-
IDENE AROMATIC HYDROCARBON MONO-
MER FORMULATIONS**
Alva F. Harris, Wilbraham, Mass., assignor to Monsanto Company, St. Louis, Mo., a corporation of Delaware
No Drawing. Filed Dec. 6, 1966, Ser. No. 599,366
Int. Cl. C08f 1/74, 7/04, 19/08
U.S. Cl. 260—886           19 Claims

ABSTRACT OF THE DISCLOSURE

A polymerization process for monovinylidene aromatic hydrocarbon monomer reaction mixtures utilizes a dimeric, trimeric or tetrameric polyketone catalyst.

---

The present invention relates to monovinylidene aromatic hydrocarbon monomer formulations and, more particularly, to a novel process and catalyst for the polymerization of such monomer formulations.

It is known that monovinylidene aromatic hydrocarbon monomers can be polymerized thermally or catalytically to prepare polymers having molecular weights and residual monomer contents which vary with certain reaction parameters; e.g., the catalyst concentration, the time and temperature of the reaction, etc. In purely thermal polymerization processes, the polymerization of the final portion of the monomer formulation is generally very slow so that preparation of a product having a desirably low residual monomer content requires an economically disadvantageous amount of time, or extensive stripping of residual monomers from the polymerized product must be employed. Even when the catalysts which are in common commercial use are added, the final stages generally are undesirably slow and the removal of residual monomers is a problem.

Accordingly, it is the aim of the present invention to provide a novel process for polymerizing monovinylidene aromatic hydrocarbon monomer formulations which is effective to polymerize the formulations to substantial completion under controlled conditions to yield a desirable product at reasonable times and temperatures.

A related aim is to provide such a process for polymerizing monovinylidene aromatic hydrocarbon monomer formulations to polymers containing a minimum amount of residual monomer without sacrifice of other desirable characteristics and without the need for auxiliary process steps such as stripping to remove residual monomer.

Other objects and advantages will be readily apparent from the following detailed specification and claims.

It has now been found that the foregoing and related objects can be readily attained in a polymerization process wherein there is admixed with 100 parts by weight of a polymerizable monovinylidene aromatic hydrocarbon monomer formulation from about 0.01 to about 2.0 parts by weight of a polyketone dimer, trimer or tetramer having monomeric units corresponding to the following formula:

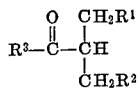

wherein $R^1$ and $R^2$ are independently selected from the group consisting of hydrogen atoms and methyl radicals and $R^3$ is selected from the group consisting of methyl, ethyl, isopropyl and isobutyl radicals. In the preferred compounds, at least one of $R^1$ and $R^2$ is a hydrogen atom. The admixture is heated to a temperature above 150° centigrade at which the polyketone is effective as a catalyst; i.e., preferably from about 180 to 220° centigrade.

The polyketones which are suitable for utilization in the polymerization processes of the present invention can be prepared by any suitable method. The method which is preferred, however, involves reacting a parent ketone monomer, e.g., methyl isopropyl ketone when the desired compound is bis(methyl isopropyl ketone), i.e., 3,3,4,4-tetramethyl hexanedione-2,5, using tert-butyl peracetate as an initiating agent. The method described by M. S. Kharasch et al. in the Journal of the American Chemical Society, vol. 70, pp. 1269–1273, 1948, may be readily adapted for the present invention. The trimers and tetramers are generally obtained as the residue remaining after distillation of dimers and other lower boiling fractions. As is indicated above, mixtures of the various fractions can be employed and will give good results, thereby obviating the necessity for separation of the various fractions.

The reaction mixture should contain at least 0.01 percent of the polyketone catalyst, based upon the initial weight of the polymerizable monomers, as the present catalysts are rather ineffective when utilized at lower concentrations. A quantity of catalyst in excess of 2.0 percent by weight is not usually warranted by the decrease in the quantity of residual monomer which is obtained thereby. Hence, the present catalysts are generally used in quantities ranging from about 0.01 to 2.0 percent, and preferably about 0.05 to 1.0 percent by weight, based upon the weight of polymerizable monomers.

The catalysts of the present invention may be employed alone or in conjunction with auxiliary chemical catalysts or with actinic radiation. Exemplary of such auxiliary chemical catalysts are perazo compounds and peroxy compounds having half lives of at least ten hours in benzene at 100° centigrade. Such peroxy compounds will vary with the polymerization process (e.g., mass, suspension) and include hydrogen peroxide, di-tert-butyl diperphthalate, tert-butyl peracetate, tert-butyl perbenzoate, dicumyl peroxide, di-tert-butyl peroxide, 2,5-dimethyl-2,5-di(tert-butyl peroxide) hexane, 2,5-dimethyl-2,5-di(tert-butyl peroxide) hexyne-3, tert-butyl hydroperoxide, cumene hydroperoxide, p-menthane hydroperoxide, cyclopentane hydroperoxide, diisopropyl benzene hydroperoxide, p-tert-butyl cumene hydroperoxide, pinane hydroperoxide, 2,5-dimethyl hexane-2,5-dihydroperoxide, etc., and mixtures thereof. When included as a catalyst component, the peroxy compound is usually employed in concentrations of about 0.01 to 5.0 percent, preferably 0.01 to 0.5 percent based upon the weight of polymerizable monomers.

Whether or not an auxiliary catalyst is added, the catalyst of the invention can be added either initially or after the formulation has been partially polymerized. Where low temperatures are desirable for at least a portion of the polymerization reaction, an auxiliary catalyst preferably is initially included; however, the reaction may be allowed to proceed thermally until the desired point of addition of the polyketone is reached.

The polymerizable formulation will, of course, contain the monomers to be polymerized, catalyst where required, and other desirable components such as stabilizers, molecular weight regulators, etc. In addition, it may contain an inert organic diluent which is miscible with the monomers and which acts as a solvent for the polymerized monomer.

Exemplary of the monovinylidene aromatic monomers that may be homopolymerized or interpolymerized are styrene; alpha-alkyl monovinylidene monoaromatic compounds, e.g., alpha-methylstyrene, alpha-ethylstyrene, alpha-methylvinyltoluene, alpha-methyl dialkylstyrenes, etc.; ring-substituted alkyl styrenes, e.g., vinyl toluene, o-ethylstyrene, p-ethylstyrene, 2,4-dimethylstyrene, etc.; ring-substituted halostyrenes, e.g., o-chlorostyrene, p-chlorostyrene, o-bromostyrene, 2,4-dichlorostyrene, etc.; ring-alkyl, ring-halosubstituted styrenes, e.g., 2-chloro-4-methylstyrene, 2,6-dichloro-4-methylstyrene, etc.; vinyl naphthalene; vinyl anthracene, etc. The alkyl substituents generally have one to four carbon atoms and may include isopropyl and isobutyl groups. If so desired, mixtures of such monovinylidene aromatic monomers may be employed.

Exemplary of other vinylidene monomers that can be employed or interpolymerized with monovinylidene aromatic monomers are unsaturated nitriles, such as acrylonitrile, methacrylonitrile, ethacrylonitrile and mixtures thereof; conjugated 1,3-dienes, e.g., butadiene, isoprene, etc.; alpha- or beta-unsaturated monobasic acids and derivatives thereof, e.g., acrylic acid, methyl acrylate, ethyl acrylate, butyl acrylate, 2-ethylhexyl acrylate, methacrylic acid and the corresponding esters thereof, acrylamide, methacrylamide, vinyl halides such as vinyl chloride, vinyl bromide, etc.; vinylidene chloride, vinylidene bromide, etc.; vinyl esters such as vinyl acetate, vinyl propionate, etc.; dialkyl maleates or fumarates such as dimethyl maleate, diethyl maleate, dibutyl maleate, the corresponding fumarates, etc. As is known in the art, the amount of these comonomers which may be included in an interpolymer will vary.

The preferred polymerizable monomer formulations contain at least 10.0 percent by weight of monovinylidene aromatic monomer and preferably at least 50.0 percent by weight thereof. Desirably, they contain an unsaturated nitrile which should be present in the amount of at least 5.0 percent by weight thereof, and preferably at least 10.0 percent. From the standpoint of highly advantageous ABS-type products, the monomer formulations contain 20.0 to 95.0 percent, and preferably they should contain 60.0 to 85.0 percent, by weight of the monovinylidene aromatic hydrocarbon such as styrene, and 80.0 to 5.0 percent, and preferably 40.0 to 15.0 percent, by weight of the unsaturated nitrile such as acrylonitrile.

If so desired, the polymerizable formulation may include a preformed rubbery polymer onto which monomers may be grafted. Exemplary of such rubbery polymers are diene rubbers, natural rubbers, ethylene-propylene rubbers, ethylene-propylene terpolymer rubbers, acrylate rubbers, polyisoprene rubbers, and mixtures thereof as well as various interpolymers involving dienes and other rubber monomers. The preferred rubbers are diene rubbers or mixtures of diene rubbers including homopolymers of conjugated 1,3-dienes with up to an equal amount by weight of one or more copolymerizable monoethylenically unsaturated monomers such as monovinylidene aromatic hydrocarbons (e.g., styrene), unsaturated nitriles (e.g., acrylonitrile), alkyl acrylates (e.g, methyl acrylate), acrylamides, e.g., acrylamide, alpha-olefins, unsaturated ketones, vinyl esters, vinyl and vinylidene halides; and the like.

Normally, the preformed polymer will be included in an amount ranging from about 1.0 to 25.0 percent by weight based upon the weight of the polymerizable monomers and preferably about 5.0 to 15.0 percent by weight.

Utilization of the instant process is not limited by any particular method of polymerization or specific series of steps, substantially the only essential requirement being that a temperature sufficiently high to activate the polyketone catalyst be employed. In most cases, that temperature should be within the range of about 180 to 220° centigrade. However, in some instances, temperatures as low as about 150° centigrade can be employed albeit with reduced effectiveness. Since 150° centigrade is considered to be practical minimum temperature for activation of the present catalyst, it is for this reason alone that the present catalysts are not well suited for use in emulsion type polymerization processes, which are generally conducted at lower temperatures. The catalysts are, however, advantageously utilized in both mass and suspension polymerization techniques, and also in processes which employ a combination utilizing at least one of such techniques.

Prior to the finishing stage, the reaction can be conducted under any conditions suitable to the technique employed and the type of product desired. Thus, the process may be conducted at above 150° centigrade throughout the reaction when a comparatively low molecular weight product is desired. Lower temperatures will, on the other hand, be maintained for a long a time as practical when a higher molecular weight product is to be produced. Methods of varying polymerization conditions to obtain a particular type of product are, of course, well known in the art. As will be readily understood, the time at which the reaction temperature should be raised to the finishing temperature will vary with the conditions which have been employed during the earlier stages of the reaction since some of these conditions normally lead to higher degrees of conversion than others. Ordinarily, the finishing temperature of greater than 150° centigrade will be utilized at least during the stage of the reaction after 95 percent conversion of monomers to polymer.

Illustrative of the efficacy of the present invention are the following specific examples in which all parts and percentages are by weight unless otherwise indicated.

EXAMPLE 1

Part A.—Control

A quantity of di-tert-butyl peroxide amounting to 0.04 part, along with 0.20 part of stearic acid, is dissolved in 100 parts of styrene monomer. The reaction vessel is purged with nitrogen and the mixture is heated at about 90° centigrade for twenty-four hours to polymerize approximately 32 percent of the styrene. The reaction mixture is then transferred to a platen and frame-type press where the temperature of the mixture is gradually raised to about 190° centigrade over a period of about five hours and maintained at that temperature for an additional four-hour period. The product obtained has a Staudinger average molecular weight in the range of 40,000 to 70,000 and a residual monomer content of approximately 1.4.

Part B

A number of products are prepared by repeating Part A except that various amounts of bis(methyl isobutyl ketone), i.e., 3,4-dimethyl-3,4-diethyl hexanedione-2,5, is dissolved initially in the monomer formulations. The residual monomer content and the Staudinger average molecular weights of the products which are obtained with the indicated percentages of bis(methyl isobutyl ketone) are presented in the table below:

TABLE 1

| | Percent residual monomer | Average molecular weight |
|---|---|---|
| Percent bis(methyl isobutyl ketone): | | |
| None | 1.4 | 51,000 |
| 0.01 | 1.39 | 51,200 |
| 0.05 | 1.28 | 52,000 |
| 0.10 | 1,12 | 50,200 |
| 0.30 | 0.69 | |
| 0.50 | | 49,500 |
| 1.00 | 0.45 | 47,500 |

As can be seen, the addition of 0.01 to 1.0 part of bis(methyl isobutyl ketone) to a styrene reaction mixture containing di-tert-butyl peroxide and stearic acid effects a decrease in residual monomer content of up to about 68 percent.

EXAMPLE 2

The process of Example 1 is substantially repeated with the exception that the catalyst employed is bis(methyl isopropyl ketone), i.e., 3,3,4,4-tetramethyl hexanedione- 2,5. A significant decrease in residual monomer content is similarly obtained.

EXAMPLE 3

The process of Example 1 is substantially repeated with the exception that the catalyst employed is a mixture primarily of trimers and tetramers of methyl isopropyl ketone. The improvement in residual monomer content is comparable to that obtained in Example 1.

EXAMPLE 4

The process of Example 1 is substantially repeated with the sole modification that the catalyst, i.e., bis(methyl isobutyl ketone), is added to the polymerization mixture just prior to transfer to the press. The polymers obtained have substantially the same desirable characteristics as those obtained in that previous example.

EXAMPLE 5

The procedure of Example 1 is substantially repeated using a reaction mixture comprising 92 percent styrene monomer and 8.0 percent of a butadiene homopolymer having a molecular weight of about 94,000, rather than being comprised of styrene monomer alone. A product is obtained which has a desirably low residual monomer content without appreciable sacrifice of its other characteristics.

Thus, it can be seen from the foregoing specification and examples that the present invention provides a novel and highly effective process for polymerizing monovinylidene aromatic hydrocarbon formulations to polymers containing a minimum amount of residual monomer without sacrifice of the other valuable characteristics and without the need for auxiliary process steps such as stripping. Accordingly, very effective polymerization may be obtained economically under controlled conditions within reasonable polymerization cycles.

It is obvious that many variations can be made in the processes set forth without departing from the spirit and scope of this invention as specifically described herein.

What is claimed is:

1. In a polymerization process, the steps comprising admixing with a polymerizable monovinylidene aromatic hydrocarbon reaction mixture containing at least 10.0 percent by weight of monovinylidene aromatic hydrocarbon monomer, from about 0.01 to 2.0 percent by weight based upon the weight of polymerizable monomers in said mixture of a polyketone catalyst selected from the group consisting of dimers, trimers and tetramers having monomeric units corresponding to the general formula:

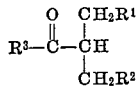

wherein $R^1$ and $R^2$ are independently selected from the group consisting of hydrogen atoms and methyl radicals and $R^3$ is selected from the group consisting of methyl, ethyl, isopropyl and isobutyl radicals; and heating the admixture under polymerization conditions to a temperature of greater than about 150° centigrade to effect polymerization of the polymerizable monomers of said reaction mixture.

2. The process in accordance with claim 1 wherein said temperature is within the range of about 180 to 220° centigrade.

3. The process in accordance with claim 1 wherein said polymerizable monovinylidene aromatic hydrocarbon reaction mixture is prepolymerized to about 30 to 45 percent by weight conversion of the monomers thereof before admixture with said polyketone catalyst.

4. The process in accordance with claim 3 wherein said polymerizable monovinylidene aromatic hydrocarbon reaction mixture is polymerized en masse until the total polymer content in said mixture is not more than 50 percent by weight thereof, and wherein said partially polymerized mixture is thereafter suspended in an inert liquid medium and subjected to polymerization of said reaction mixture.

5. The process in accordance with claim 1 wherein said polymerizable monovinylidene aromatic hydrocarbon reaction mixture contains from about 1 to 25 percent by weight, based upon the weight of polymerizable monomers in said polymerizable monovinylidene aromatic hydrocarbon reaction mixture, of a preformed rubbery polymer onto which polymeric chains of said polymerizable monomers can be grafted.

6. The process in accordance with claim 1 wherein at least one of $R^1$ and $R^2$ is a hydrogen atom.

7. The process in accordance with claim 1 wherein $R^1$ is a hydrogen atom, $R^2$ is a methyl radical and $R^3$ is an ethyl radical.

8. The process in accordance with claim 7 wherein said polyketone is a dimer.

9. The process in accordance with claim 1 wherein $R^1$ and $R^2$ are hydrogen atoms and $R^3$ is an ethyl radical.

10. The process in accordance with claim 9 wherein said polyketone is a dimer.

11. The process in accordance with claim 9 wherein said polyketone is a mixture consisting at least predominantly of trimers and tetramers.

12. The process in accordance with claim 1 wherein said polymerizable monovinylidene aromatic hydrocarbon reaction mixture contains at least one additional monomer copolymerizable with the monovinylidene aromatic hydrocarbon monomer of the mixture.

13. The process in accordance with claim 12 wherein said additional monomer is an unsaturated nitrile.

14. The process in accordance with claim 1 wherein said monovinylidene aromatic hydrocarbon is styrene.

15. The process in accordance with claim 1 wherein said reaction mixture is polymerized en masse.

16. The process in accordance with claim 1 wherein said reaction mixture contains, based upon the monomers therein, 60 to 85 percent of styrene and 40 to 15 percent of acrylonitrile.

17. In a polymerization process, the steps comprising admixing from about 0.05 to 1.0 percent by weight of a polyketone catalyst selected from the group consisting of 3,4-dimethyl-3,4-diethyl hexanedione-2,5, a mixture consisting predominantly of trimers and tetramers of methyl isopropyl ketone and 3,3,4,4-tetramethyl hexanedione-2,5 with 100 parts by weight of a polymerizable monovinylidene aromatic hydrocarbon reaction mixture comprised at least principally of styrene monomer; and heating the admixture under polymerization conditions to a temperature within the range of about 180 to 220° centigrade to effect polymerization of the monomers of said mixture.

18. The process in accordance with claim 17 wherein said polymerizable monovinylidene aromatic hydrocarbon reaction mixture contains from about 1 to 25 percent by weight based upon the weight of polymerizable monomers of a preformed rubbery polymer onto which polymeric chains of said polymerizable monomers may be grafted.

19. The process in accordance with claim 17 wherein said reaction mixture contains, based upon the monomers therein, 60 to 85 percent of styrene and 40 to 15 percent of acrylonitrile.

References Cited

UNITED STATES PATENTS 3,062,797  11/1962  Stanek.
3,222,426  12/1965  Dietrich et al.

HARRY WONG, Jr., Primary Examiner

U.S. Cl. X.R.

260—78.5, 82.1, 83.7, 85.5, 86.3, 86.7, 87.1, 87.3, 87.5, 87.7, 88.1, 88.2, 91.5, 93.5, 879, 880, 887, 892